Sept. 14, 1943.  F. D. JONAS  2,329,201
COMBINED SUSPENSION AND VISIBLE FILING SYSTEM
Filed Nov. 8, 1941  4 Sheets-Sheet 1
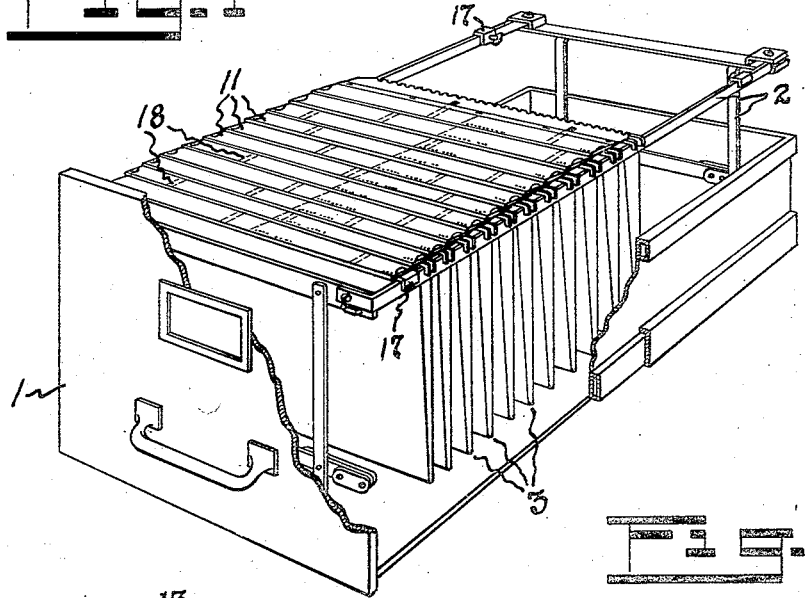
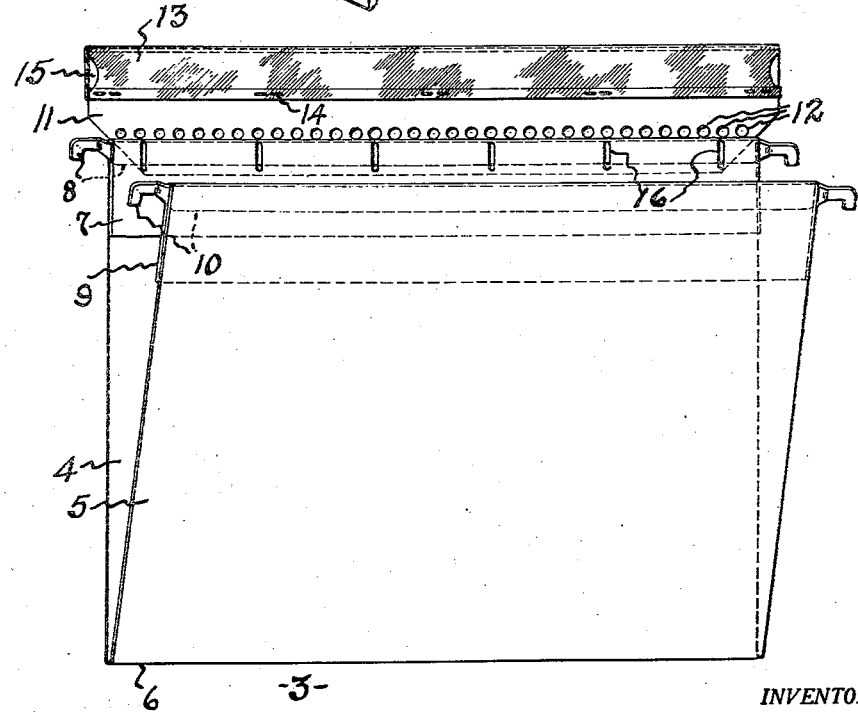
INVENTOR.
Frank D. Jonas
BY Darby & Darby
ATTORNEYS.

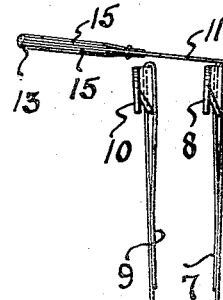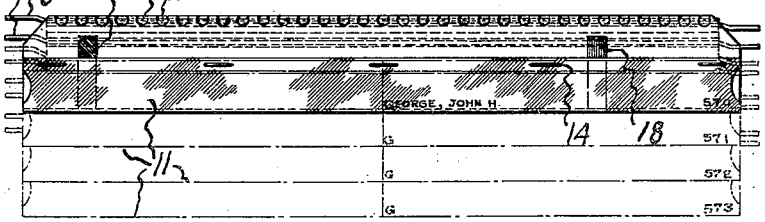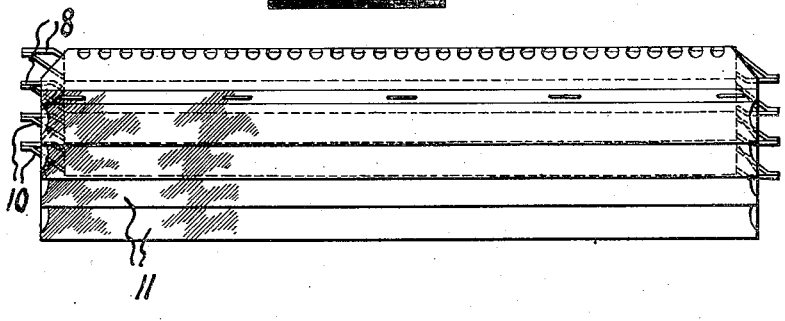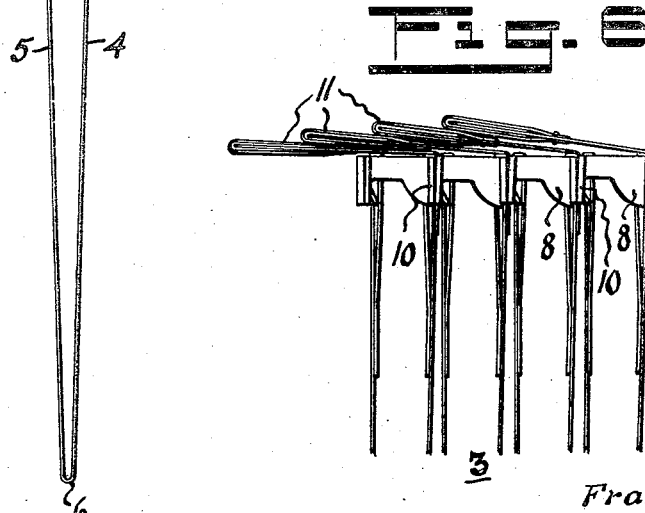

Sept. 14, 1943.　　　　F. D. JONAS　　　　2,329,201
COMBINED SUSPENSION AND VISIBLE FILING SYSTEM
Filed Nov. 8, 1941　　　4 Sheets-Sheet 3
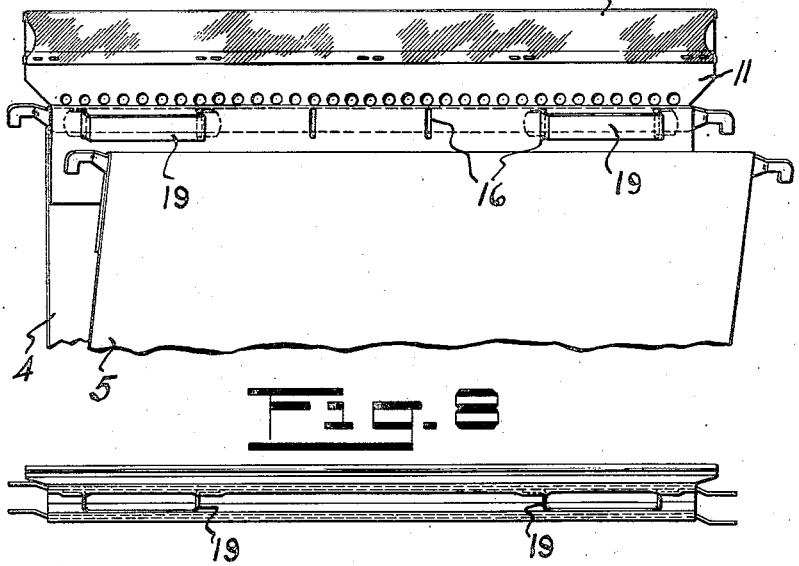
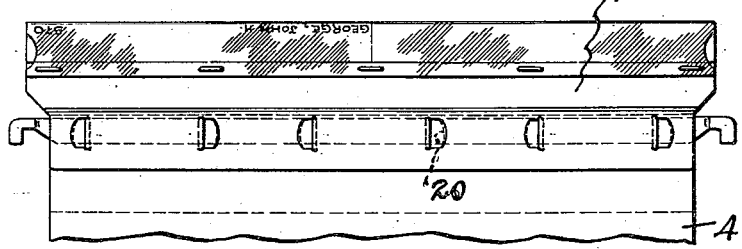
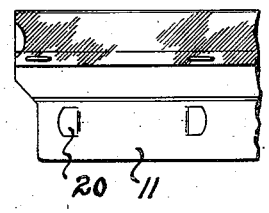
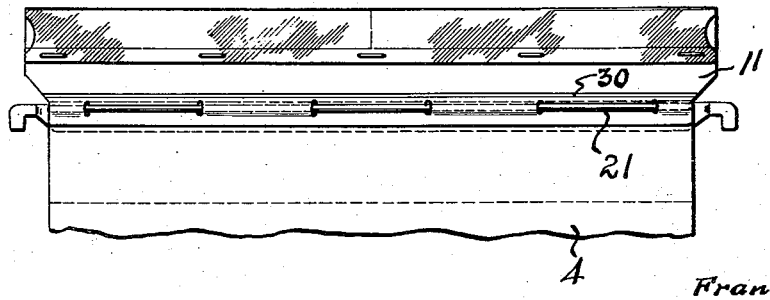
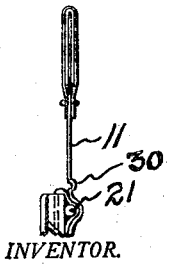
INVENTOR.
Frank D. Jonas
BY Darby & Darby
ATTORNEYS Sept. 14, 1943.   F. D. JONAS   2,329,201
COMBINED SUSPENSION AND VISIBLE FILING SYSTEM
Filed Nov. 8, 1941   4 Sheets-Sheet 4
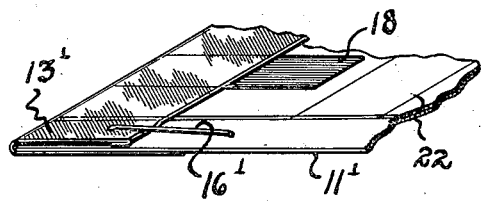
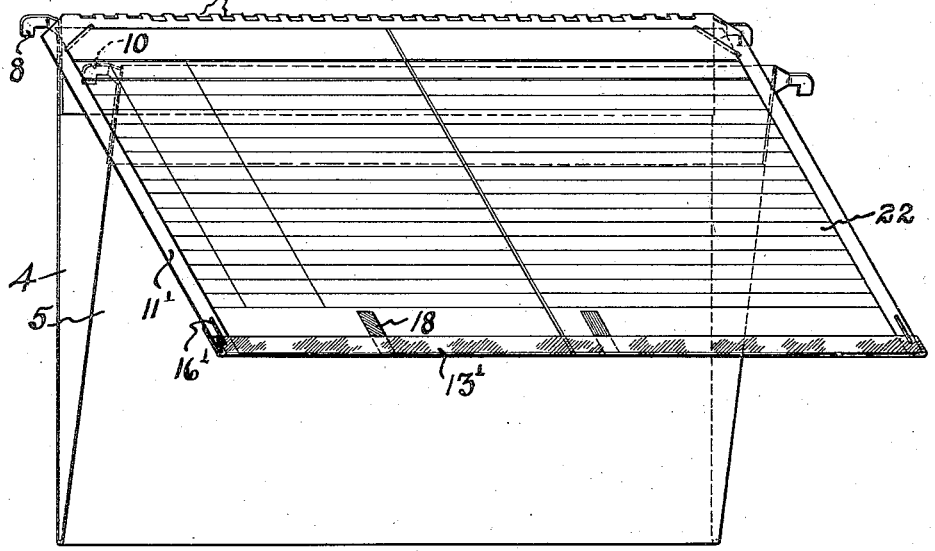
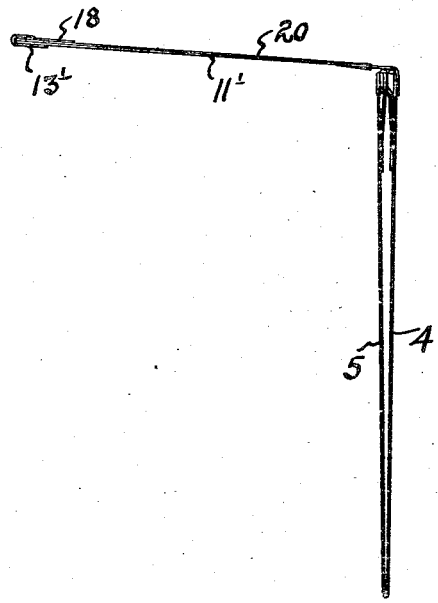
INVENTOR.
Frank D. Jonas
BY Darby & Darby
ATTORNEYS Patented Sept. 14, 1943

2,329,201

UNITED STATES PATENT OFFICE 2,329,201

COMBINED SUSPENSION AND VISIBLE FILING SYSTEM

Frank D. Jonas, East Williston, N. Y., assignor to Oxford Filing Supply Co., Brooklyn, N. Y., a partnership Application November 8, 1941, Serial No. 418,356

3 Claims. (Cl. 129—16)

This invention relates to filing systems which combine the features of the suspension folder system and the visible filing system.

An object of this invention is to provide a suspension pocket filing system in combination with a data record viewing system.

Another object of this invention is to provide in such a combined system a substantially unbroken surface composed of separate overlapping filing elements individually attached to the suspension folders to provide for visible indication and coding of filing matter housed in the related folders.

A still further object of this invention is the provision of a substantially flat indexing surface composed of separate overlying filing elements forming parts of filing folders so arranged as to allow expansion and contraction of the filing folders with changes in quantity of matter filed therein while maintaining continuity of the indexing surface.

Further and additional, but more detailed objects of the invention will be apparent from the following description of several embodiments thereof when taken in connection with the attached drawings.

This invention resides substantially in the combination, construction, arrangement and relative location of parts as will be described in detail below.

In the accompanying drawings,

Figure 1 is a perspective view with some parts broken away showing the complete filing and visible indexing system in accordance with this invention;

Figure 2 is an asymmetric view of one of the suspension filing folders made in accordance with this invention;

Figure 3 is a right hand elevational view of the structure of Figure 2;

Figure 4 is a top plan view of the structure of Figure 3 diagrammatically illustrating the relation of several of the elements of Figure 3 when in use;

Figure 5 is a top plan view of a plurality of folders and visible indexing flaps in accordance with this invention showing a feature of modification;

Figure 6 is a right hand end elevational view of the elements of Figure 5;

Figure 7 is a perspective broken view of a structure similar to that of Figure 2 with a spacing device applied thereto;

Figures 8 and 9 are top plan and right hand end elevational views of the structure of Figure 7;

Figure 10 is a rear elevational view of a portion of a modified form of structure in accordance with this invention;

Figure 11 is a detailed broken view of the flap of the structure of Figure 10;

Figure 12 is a view similar to that of Figure 10 of a modified construction;

Figure 13 is a right hand end elevational view of the structure of Figure 12;

Figure 14 is a perspective view of a still further modified form of the invention showing the visible indexing flap in a different form;

Figure 15 is a right hand end elevational view of the structure of Figure 14; and Figure 16 is an enlarged detailed perspective view of a corner of the flap of this structure.

The full nature of the invention will best be appreciated by a brief reference to the prior state of this art. The invention resides primarily in the cooperative combination of the visible data indexing system and the suspension filing folder system as independently used in the prior art. The visible indexing system as it is now known in the trade comprises a plurality of filing cards or the like mounted on a common support and arranged to lie in overlapping position with a margin at the bottom edge of each card exposed. The exposed margin is commonly about ¼ inch in width, sufficient for a line of type, and is sometimes known as the "exposure." In such systems the cards are hinged at their rear ends so that they may be readily turned over to open at the place desired, and to expose the rear surface of the card for use if desired. Quite frequently the cards themselves are not actually mounted on hinges, but are removably mounted in holders which are all hinged on a common support. With this system the cards are relatively arranged so as to lie in overlapping relation in a substantially flat plane exposing the marginal edge of each for identifying data.

The suspension filing system as commonly employed consists of a plurality of filing folders suspended from their upper free edges upon suitable supporting reels or rails to provide V-shaped pockets opening upwardly into which matter to be filed may be readily deposited from above. As hereinafter disclosed, in full detail, the invention herein comprises a conception combining in a cooperative relationship the structural features of a visible indexing system whereby all of the advantages of each individually are secured together with additional advantages resulting from their combination.

In Figure 1 there is shown a drawer 1 of a filing cabinet which is provided in any suitable manner with a rail forming structure 2 mounted therein upon which a plurality of suspension filing folders 3 are mounted so as to depend therefrom into the drawer. Each of the filing folders as illustrated comprises a single sheet of suitable fibrous material folded above a substantially medial fold line 6 to form the rear and front walls 4 and 5 respectively. The upper terminal edge of the rear wall 4 is folded downwardly and inwardly upon the rear wall to provide a flap 7 which is glued or otherwise fastened to the inner face of the rear wall so as to form an open-ended channel at the bend which receives the suspension rod 8. In a similar way the upper edge of the front wall 5 is folded inwardly and downwardly to provide a flap 9 which is secured in any suitable manner as by gluing to the inner face of the front wall, and to provide a channel in which the front suspension bar 10 is mounted. A flap 11 of suitable size is attached in any suitable manner as by gluing to the outer face of the rear wall along its upper edge as shown. This flap is adapted to fold forwardly over the open top of the filing pocket, so as to lie substantially horizontally and to facilitate this hinging action a line of apertures 12 are cut in the flap to form a line of weakness to determine the point of hinge action. The flap 11 may be of any suitable material, but is preferably of plastics and fibrous materials such as heavy paper, cardboard, fibre board, and the like. The free edge of the flap 11 is encased by a U-shaped transparent sheath 13 made of some suitable material such as Celluloid, cellulose acetate and the like. This sheath is attached to the flap in any suitable manner, as for example by means of the staples 14 so as to leave channels on either side of the flap in which index strips 15 may be mounted. Data printed or typed on these strips will be exposed through the transparent sheath 13 and as illustrated in Figure 3, these strips may be employed on both sides of the flap. This construction is adapted to the use of signals 18 commonly used in this art. A plurality of these structures are supported on the framework 2 by means of the hooked ends of the suspension bars so that progressing towards the back of the drawer of Figure 1, for example, it will be seen that the flaps 11 partially overlap, but as indicated in Figure 4, a marginal edge is uncovered to provide the "exposure" common to a visible system. By lifting up the flap at a particular point and swinging it backwardly as in a visible system, the contents of the desired folder become accessible and the data on the rear strip 15 is exposed to view. If desired a plurality of adjustable stops 17 may be mounted on the framework to confine a series of folders to a given space as required by their contents. These stops by confining the folders to a predetermined space also insure the proper overlapping of the flaps 11. It is, of course, apparent that if desired the flaps 11 do not need to extend throughout the full width of the folders. The slots 16 in Figure 2 provide means for attaching spacers the nature and function of which will be described below in more detail in connection with Figure 7 illustrating them. As will be clear from the full disclosure, the proper spacing of the upper edges of each folder is accomplished by the offset ends of the suspension bars or by means of the spacer members, to be described, and, therefore, the slots 16 are provided in all the folders so as to make them universal in this respect.

Attention is called to Figure 2, wherein is clearly illustrated the feature that the flap 11 is wider than the folder, so that its end edges can rest on the rails or hooked ends of the suspension bars which lie in a common plane insuring that the flaps lie substantially in that plane. This extension of the flaps at the ends is desirable but not necessary since except in the case of the frontmost folder the flaps may all rest on adjacent folders so that means need only be provided to insure that the flap of the frontmost folder is held horizontal.

In order to contribute to the uniformity of appearance of the device and to insure substantially uniform "exposures" of the flaps irrespective of the contents of the folders within limits, the ends of the suspension bars may be offset different amounts to space the upper edges of the front and rear walls of each folder from each other a uniform distance. Thus the opposite ends of the suspension bars 8 are offset a different amount transversely to the plane of the bars, as seen in Figure 5, and the opposite ends of the bars 10 are complementarily offset with respect to the ends of the bars 8 to provide this uniform spacing of the edges of the walls of each pocket. The same result can be secured by leaving one end of each bar straight and offsetting the other end of each so that the offset end of each is opposite the straight end of the other. This spacing determines the minimum distance between the top edges of the walls and until the contents of the file require a greater distance insures uniform "exposures" of the marginal edges of the flaps. This contributes to the orderliness and neat appearance of the structure.

A modified form of spacing device is illustrated in Figures 7, 8, and 9. The flap 7 at the channel is provided with a plurality of slots 16 into which substantially U-shaped spacers 19 may be slipped to insure a minimum spacing of the upper edges of the front and rear walls of each folder. As is clear from these figures, the function of the spacers 19 is the same as the offset ends of the suspension rods.

Whereas the structure of the previous figures shows the flap 11 glued to the rear wall, the structures of Figures 10 to 13 inclusive show a different attaching means. In the structure of Figures 10 and 11 the flap 11 is provided with a series of cut-out tabs 20 which are folded into slots on the rear wall 4 similar to the slots 16 so that tabs 20 may be folded thereinto as illustrated. This provides a detachable flap 11 which may be replaced or renewed in the event of wear. A modified arrangement is shown in Figures 12 and 13, wherein the flap 11 is attached to the rear wall by means of a pin or rod 21 which is threaded through openings in the rear wall, and in the flap to lock the flap in place. This score line 30 provides the line of hinge action. It may be noted that the pin or rod may be used to provide a hinge pin by which the flap is hinged to the folder.

The structure in Figures 14 to 16 inclusive involves a modification of the general idea of this invention. With this structure the flap may not only provide a visible indexing system but may in addition provide a visible data recording system which may give in detail file information with regard to the contents of the file. In this case each file folder is the same as that previously described and the flap is secured thereto at the rear wall in any of the manners previously described, or in any equivalent way. In this case the flap is indicated at 11' and is shown considerably longer than that of the previous arrangement so as to provide a support or holder for a data card 22 which is detachably mounted thereon. The free marginal edge of the holder 11' is encased in a sheath 13' which is desirably of transparent material. It is attached to the flap by means of the staples 16', or in any other equivalent manner. The staples are applied at the ends so that the lower edge of the card 22 may be slipped under the sheath, as shown, while the corners at the opposite edge may be slipped into slots in the holder 11' as shown.

This structure is similar to that previously described but provides a wider flap which is quite similar to the usual visible system, so that extensive data as to the contents of the folder may be recorded for easy access. The free marginal edge or the "exposure" may be employed as before to record the indexing data related to the full data on the card. A plurality of these folders would be employed as in the arrangement of Figure 1 to provide a combined visible and suspension filling system.

It will be apparent from the foregoing description that the details of this invention may be varied in accordance with modifications apparent to those skilled in the art, and I do not, therefore, desire to be strictly limited to the disclosure as given for purposes of illustration, but rather to the scope of the claims granted me.

What is claimed is:

1. A combined suspension filing and visible index system comprising a plurality of open top filing receptacles each having front and rear walls, means for independently suspending said folders from the top edges of said walls, planar flaps hingedly connected respectively to corresponding walls of said receptacles and lying across the open tops of said receptacles in overlapping arrangement to expose the marginal edge of each flap, and means for maintaining uniform spacing of the walls of each receptacle at its open top and uniform exposure of the marginal edge of each flap throughout the width thereof.

2. In the combination of claim 1 the means for maintaining a uniform spacing comprising detachable clips.

3. In the combination of claim 1 the means for suspending said folders including bars projecting beyond the walls at each end and being offset to provide said means for maintaining uniform spacing.

FRANK D. JONAS.